(12) United States Patent
Diperna et al.

(10) Patent No.: US 9,582,391 B2
(45) Date of Patent: Feb. 28, 2017

(54) LOGISTICS OF STRESS TESTING

(71) Applicant: w2bi, Inc., South Plainfield, NJ (US)

(72) Inventors: Derek Diperna, Medford Lakes, NJ (US); Amit Kucheriya, Edison, NJ (US); Dinesh Doshi, South Plainfield, NJ (US); Jose S. Blanco, Red Bank, NJ (US); Alrick Courten, Plainfield, NJ (US); Deepa Jagannatha, Somerset, NJ (US)

(73) Assignee: W2BI, INC., South Plainfield, NJ (US)

( * ) Notice: Subject to any disclaimer, the term of this patent is extended or adjusted under 35 U.S.C. 154(b) by 747 days.

(21) Appl. No.: 13/865,724

(22) Filed: Apr. 18, 2013

(65) Prior Publication Data

US 2013/0282334 A1 Oct. 24, 2013

Related U.S. Application Data

(60) Provisional application No. 61/635,125, filed on Apr. 18, 2012.

(51) Int. Cl.
| | | |
|---|---|---|
| G06F 11/30 | (2006.01) | |
| G06F 15/00 | (2006.01) | |
| G06F 11/34 | (2006.01) | |
| G06F 11/36 | (2006.01) | |
| H04L 12/26 | (2006.01) | |
| H04L 12/24 | (2006.01) | |
| H04L 29/08 | (2006.01) | |

(52) U.S. Cl.
CPC .......... *G06F 11/30* (2013.01); *G06F 11/3433* (2013.01); *G06F 11/3664* (2013.01); *G06F 11/3688* (2013.01); *H04L 12/2697* (2013.01); *H04L 41/5038* (2013.01); *H04L 67/34* (2013.01); *G06F 11/3414* (2013.01)

(58) Field of Classification Search
CPC ..... H04L 43/50; H04L 12/2697; H04L 41/06; H04W 24/06
USPC .......... 702/127, 182, 183; 370/250; 455/424
See application file for complete search history.

(56) References Cited

U.S. PATENT DOCUMENTS

| | | |
|---|---|---|
| 6,577,871 B1 | 6/2003 | Budka et al. |
| 7,606,918 B2 | 10/2009 | Holzman et al. |
| 8,054,221 B1 | 11/2011 | Luong et al. |
| 8,150,365 B2 | 4/2012 | Chen et al. |
| 8,284,682 B2 * | 10/2012 | Huq et al. ................. 370/250 |
| 8,478,263 B1 | 7/2013 | Lan et al. |
| 8,489,032 B2 | 7/2013 | Gordiyenko et al. |
| 8,811,192 B2 | 8/2014 | Luong |
| 9,037,150 B1 | 5/2015 | Vivanco et al. |
| 2001/0053176 A1 | 12/2001 | Fry et al. |
| 2003/0162580 A1 | 8/2003 | Cousineau et al. |
| 2004/0130484 A1 | 7/2004 | Krasner |
| 2005/0032493 A1 | 2/2005 | Sugiyama et al. |
| 2007/0066268 A1 | 3/2007 | Simic et al. |
| 2007/0243825 A1 | 10/2007 | Olgaard et al. |

(Continued)

*Primary Examiner* — An Do

(57) ABSTRACT

A method of validating the end to end performance of a mobile device including performance of applications, related services, and the mobile device by automating the conditions of the End User environment. The method is accomplished by leveraging stress models and applying these to automate the stressing of applications, their related services, while the device performance is being monitored by varying the emulated radio network and packet data network conditions.

20 Claims, 5 Drawing Sheets

(56) References Cited

U.S. PATENT DOCUMENTS

| | | |
|---|---|---|
| 2007/0285309 A1 | 12/2007 | Atkinson |
| 2008/0039070 A1 | 2/2008 | Ptashek |
| 2008/0058057 A1 | 3/2008 | Lau et al. |
| 2009/0131043 A1 | 5/2009 | Uchida et al. |
| 2009/0207745 A1 | 8/2009 | Huq et al. |
| 2009/0209250 A1 | 8/2009 | Huq |
| 2010/0117668 A1 | 5/2010 | Redlich et al. |
| 2010/0123471 A1 | 5/2010 | Olgaard et al. |
| 2010/0273425 A1 | 10/2010 | Varanda |
| 2012/0122406 A1 | 5/2012 | Gregg et al. |
| 2013/0301694 A1 | 11/2013 | Olgaard |
| 2014/0194069 A1 | 7/2014 | Liu et al. |

* cited by examiner

LOGISTICS OF STRESS TESTING

PRIORITY CLAIM

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/635,125, entitled "LOGISTICS OF STRESS TESTING", filed on Apr. 18, 2012. The contents of which the above referenced application is incorporated herein by reference in its entirety.

FIELD OF INVENTION

The present invention relates to mobile wireless communication devices, systems, networks, and methods of determining mobile device behavior when being stressed in a lab environment.

BACKGROUND OF THE INVENTION

This invention describes remote management of automated mobile application tests to be executed on the mobile devices, tablets or any wireless computing device that may be connected to network emulators or on live networks. This invention primarily focuses on the mobile device behavior when being stressed in a lab environment.

End to End monitoring and troubleshooting of mobile applications on smartphones can show the exactly how the end users see and perceive as to how the application behaves in the real world. Pre-market lab testing minimizes known quality risks, but cannot account for all end user scenarios. Carriers/OEMs have increasing return costs for smartphones when end users return them without a specific issue "No Trouble Found" or "No Fault Found". Returned devices can be stress tested to isolate end user challenges with specific models. Stress can be in the form of OS or application stress testing and/or stress of network performance.

Traditionally these tests are manually performed due to fast pace software changes and the rate mobile applications are being introduced. Simulating different radio and IP network conditions concurrently while performing application specific actions is complex and requires coordination and synchronization of systems through a central system.

SUMMARY OF THE INVENTION

The current invention is a method of validating the end to end performance of a mobile device including performance of applications, related services, and the device by automating the conditions of the End User environment. This includes automation of the device, End User, and specific network conditions. This is accomplished by leveraging stress models and applying these to automate the stressing of applications, their related services, while the device performance is being monitored by varying the emulated radio network and packet data network conditions. The emulated network conditions are synchronously varied to simulate everything from normal and edge conditions of the network, to low performance scenarios. This invention's intent is to validate the device and application behavior that is representative of typical end user scenarios in a predictable and consistent way. Stress isolation results can be applied in Pre-Market test plans.

An objective of the invention is to create a predictable starting point profile from returned devices: Capturing the state of the returned End User device (loaded applications, memory utilization and content, processing utilization, etc.) and mirroring for DUT (Device Under Test).

Another objective of the invention is to capture offending device configuration, as well as isolate poor performing applications (SIP/IMS etc.) and services for MTBF, MTFF etc.

Still another objective of the invention is to provide method of testing that is applicable across the mobile industry, specifically the testing groups across the mobile operators, device manufacturers, application developers, testing services, and content providers.

Yet another objective of the invention is to provide reverse stress testing to allow Carriers/OEMs to confidently market their mobile devices with applications intended to behave in a predictable pattern.

Still another objective of the invention is to allow aggregators and developers to accelerate the time to market their mobile applications.

Still another objective of the invention is to provide a benchmark for the maximum load of an application usage that the mobile device can sustain before experiencing system failure while the objective of stress testing is to validate an application's stability and reliability over an extended period of time.

Another objective of the invention is to manage the end to end test execution process from a single graphical user interface that manages the target mobile device, the applications on the device, the emulated radio network conditions, the simulated mobile services (e.g. IP Multi Media Services), and the connectivity to external internet.

Still another objective of the invention is to provide Test Automation that allows Repeatable test sequence (built from random track)—Allowing for a random process to simulate End User events, record these events, and create a test sequence that can be repeated across the same device many times, or many devices.

Yet still another objective of the invention is to assure the user that the application features are supported by the devices as per specifications.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
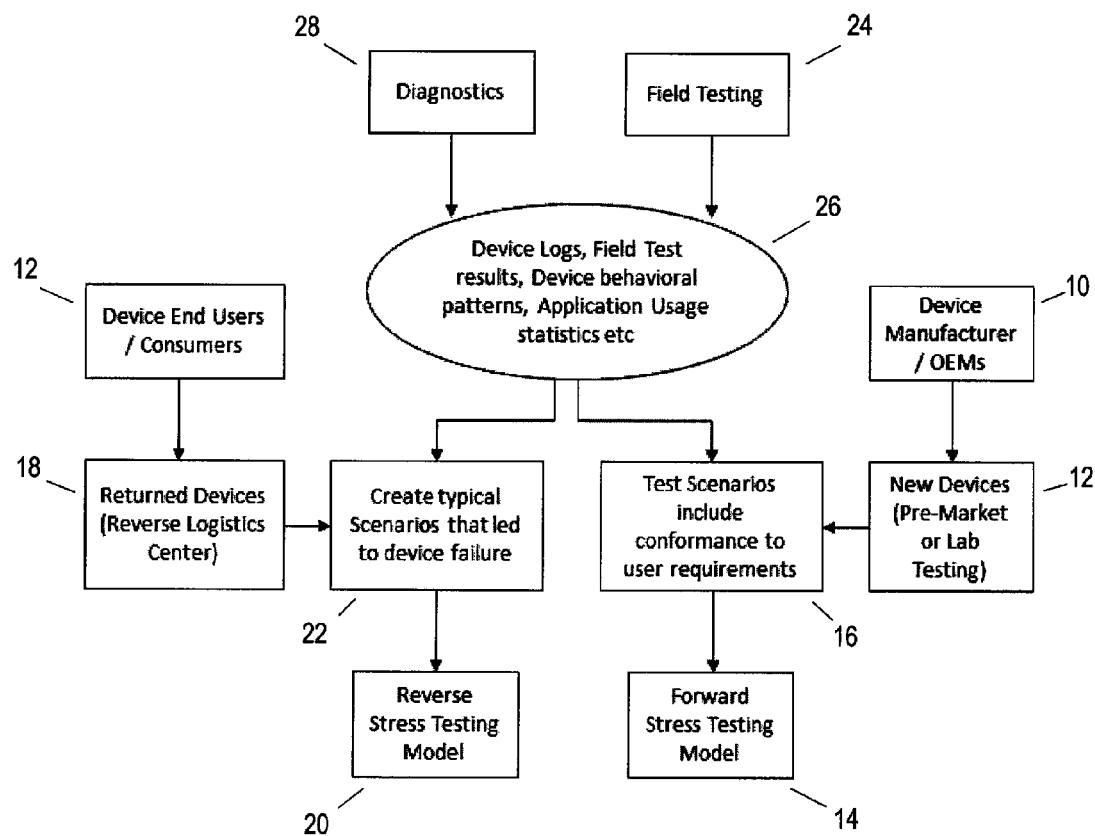
FIG. 1 is a diagram of a Stress Test Model.

Referring to FIG. 1, the current invention is a method of validating the end to end performance of device (includes mobile devices, tablets or any wireless computing device)

including performance of applications, related services, and the device by automating the conditions of the End User environment. This includes automation of the device, End User, and specific network conditions. This is accomplished by leveraging stress models and applying these to automate the stressing of applications, their related services, while the device performance is being monitored by varying the emulated radio network and packet data network conditions. The method works for new phones such as those provided by the device manufacturer/OEM 10 as well as the device end user/consumer 12.

Stress testing determines the ability of a mobile device to maintain a certain level of effectiveness under unfavorable conditions. The process can involve quantitative tests done in a lab, such as measuring the frequency of errors or system crashes. The term also refers to qualitative evaluation of factors such as availability of the device. Stress testing is often done in conjunction with the more general process of performance testing.

Stress testing can be applied in Pre-Market and R&D engineering 12 by use of a Forward Stress Testing Model 14 suing test scenarios 16 that include conformance to user requirements. Stress testing can also be applied in Reverse Logistics Centers by use of a Reverse Stress Testing Model 20 by creating typical scenarios 22 that led to the device failure. Stress testing can be applied in Field Testing 24 by use of a Field Trial Stress Model 26. Stress testing can be applied in Customer Care Diagnostics 28 by use of Diagnostics based upon the Trial Stress Model 26. The Trial Stress Model is modeled after device logs, field test results, device behavioral patterns, application usage statistics and the like gathered information collected in memory.

Forward Stress Testing Model 14 employs an adverse environment that is deliberately created and maintained. The adverse condition is progressively and methodically worsened, until the performance level falls below a certain minimum or the system fails altogether. In order to obtain the most meaningful results, individual stressors are varied one by one, leaving the others constant. This makes it possible to pinpoint specific weaknesses and vulnerabilities. Once the testing process has caused a failure, the final component of stress testing is determining how well or how fast a system can recover after an adverse event.

Reverse Stress Testing Mode 20 is used as Carriers/OEMs have increasing return costs for smartphones when end users return them without a specific issue "No Trouble Found" or "No Fault Found". Hence Carriers/OEMs need a well-planned Reverse Logistics Solution to reduce the volume of device returns. It can be achieved only through the identification and elimination of common issues that plague the consumers which force them to return their devices. Reverse Stress Testing is a process of identifying the point at which the mobile device seizes to function normally and then identifying the scenarios that might cause this to occur. Reverse Stress Testing helps Carriers/OEMs to build better benchmarking model by applying different stress scenarios and viewing the impact each scenario has on the mobile device.

Field Testing 24 is performed in the carrier's live market. Extensive call processing testing is performed with the mobile phone under test in parallel with a 'benchmark' mobile phone to determine call processing statistics. Statistics are collected and analyzed.

Device Diagnostics 28 allows Carriers to monitor the health and performance of the mobile devices in the network. Diagnostics process uniquely models the results to isolate the offending issue. While stress automation is being conducted, automatic gathering of the device vitals allows for data to be oriented in a database for direct comparison.

In order to make Application recorded sessions to work across device life cycle, different models, different mobile device operating systems and varying network conditions, have to be abstracted so it is agnostic to the underlying device platforms and network state.

Figure 2:
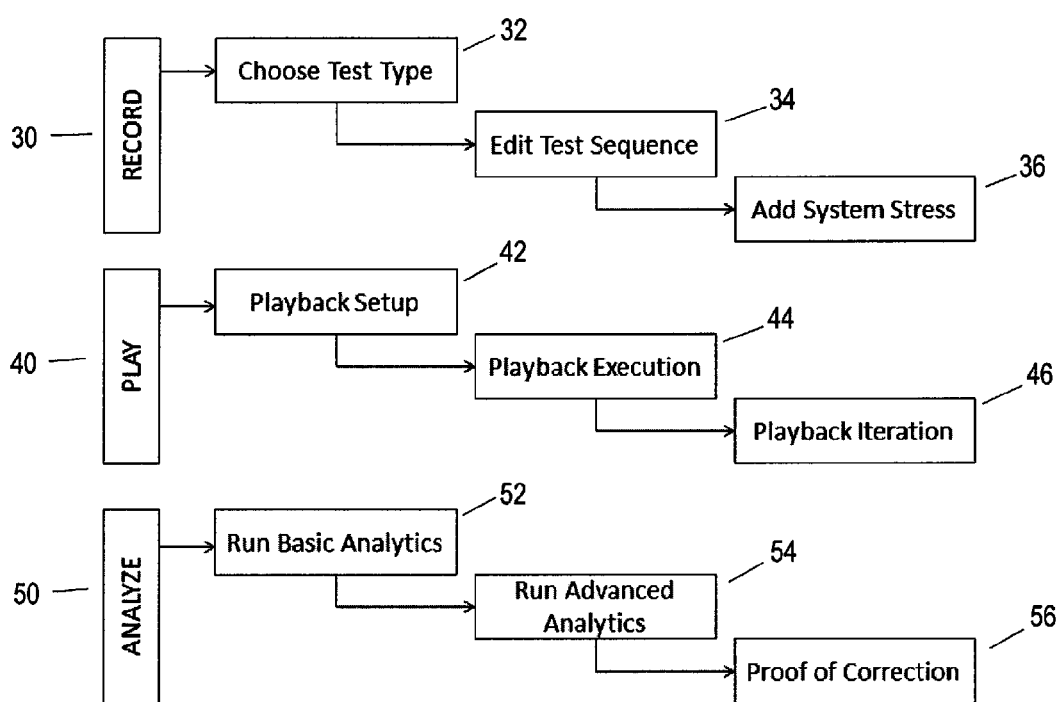
FIG. 2 is a diagram of an Automation Workflow Model.

Referring to FIG. 2, set forth is an automation workflow model wherein test automation software is responsible to apply the abstracted sequence of application actions and modify the network conditions across multiple network emulators synchronously, and to manage the end to end process of initiating, coordinating and collecting the end results. Test Automation allows Repeatable test sequence (built from random track)—allowing for a random process to simulate End User events, record these events, and create a test sequence that can be repeated across the same device many times, or many devices. Under the record sequence 30, a test type 32 is chosen, the test sequence 34 can be edited and the edited test added 36 to provide system stress. Under the play sequence 40, the playback is setup 42, the playback is executed 44 and the playback iteration 46 for repeating the process to reach a desired stress goal. Under the analyze sequence 50, basic analytics is run 52, advanced analytics is run 54 and proof of correction is monitored 56.

Figure 3:
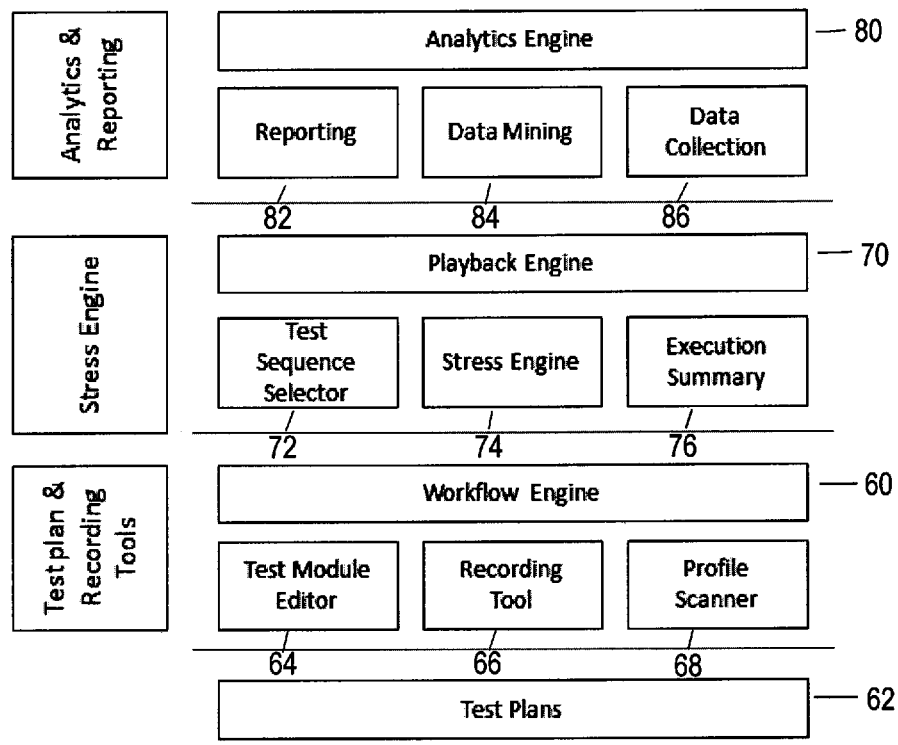
FIG. 3 is a diagram of the functional components defining the engines.

Referring to FIG. 3, depicted are the functional components comprising a Workflow Engine 60 to extract the requirements from the test plan 62 and create a test case. The Workflow Engine having a test module editor 64, a recording tool 66 and a profile scanner 68. Each test case can be saved as a profile and can be recorded for future use. The Playback Engine 70 loads these profiles and creates a typical stress environment as required. The Playback Engine 70 having a test sequence selector 72, a stress engine 74 function and an execution summary 76. Once the test case is executed the reports are collected by the Analytics engine 80 for Reporting 82, data mining 84 and data collection 86. The Analytics engine 80 lets the user measure the KPIs for the device performance like battery, CPU and memory.

The benefits of this invention are applicable across the mobile industry, specifically the testing groups across the mobile operators, device manufacturers, application developers, testing services, and content providers. The method of Reverse Stress Testing allows Carriers/OEMs to confidently market the mobile devices with applications intended to behave in a predictable pattern. Allows aggregators and developers to accelerate the time to market their mobile applications. Benchmark the maximum load of an application usage that the mobile device can sustain before experiencing system failure while the objective of stress testing is to validate an application's stability and reliability over an extended period of time. Manages the end to end test execution process from a single graphical user interface that manages the target mobile device, the applications on the device, the emulated radio network conditions, the simulated mobile services (e.g. IP Multi Media Services), and the connectivity to external internet. Test Automation allows Repeatable test sequence (built from random track)—Allowing for a random process to simulate End User events, record these events, and create a test sequence that can be repeated across the same device many times, or many devices and assures the user that the application features are supported by the devices as per specifications.

Figure 4:
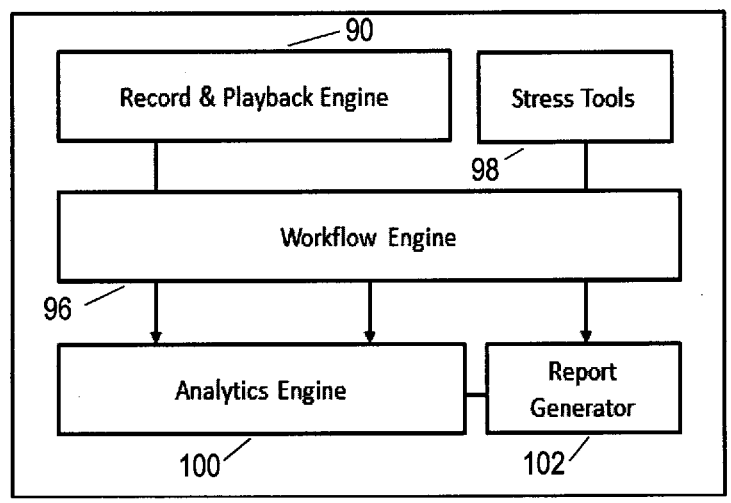
FIG. 4 is a diagram of the functional design.
Figure 5:
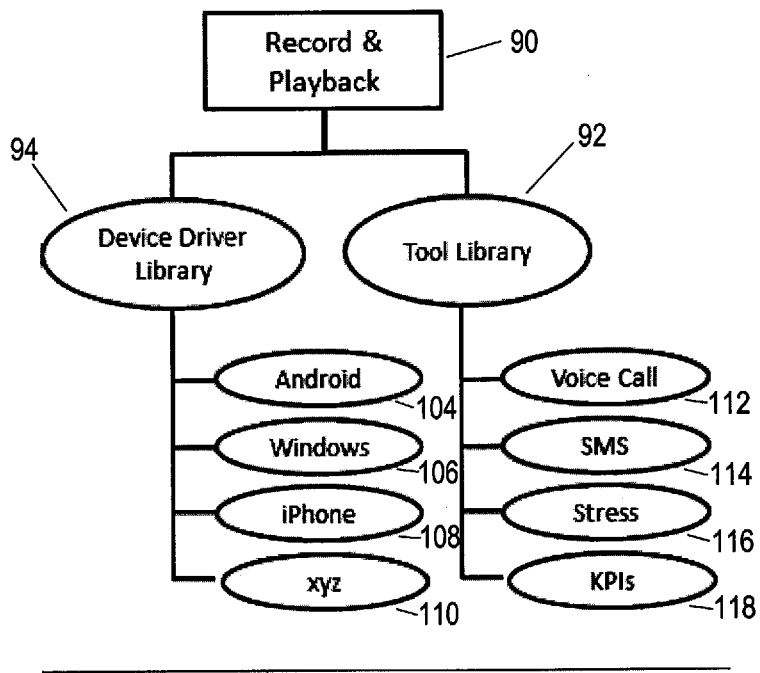
FIG. 5 is a diagram of the record and playback engine.

FIGS. 4 and 5 depict a Record & Playback Engine 90 which contains the necessary tools to communicate and execute a function on a remote device and encompasses tool library 92 and a device driver library 94. The Record &

Playback Engine communicate with a Workflow engine 96 having stress tools 98 for operating. The Workflow engine 96 coupled to an analytics engine 100 and report generator 102. The Tool Library 92 is a collection of tools used to execute a command/function on the device. The device driver library 94 chooses from the current phones on the market such as the Android 104, Windows 106, iPhone 108, and the like 110 cellular telephones. The tool library choosing from a voice call 112, SMS 114, Stress 116 or KPis 118. The device driver library 92 is a collection of device drivers for different OS type used to communicate with the device.

Figure 6:
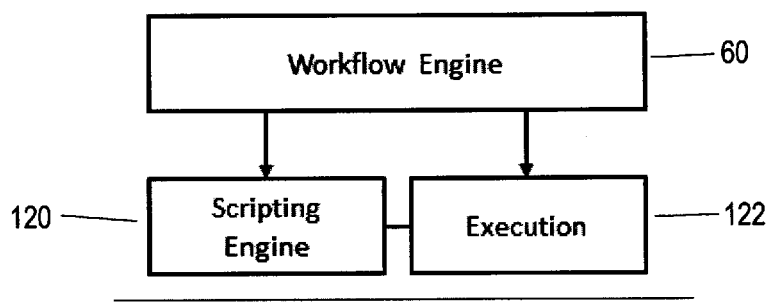
FIG. 6 is a diagram of the workflow engine.
Figure 7:
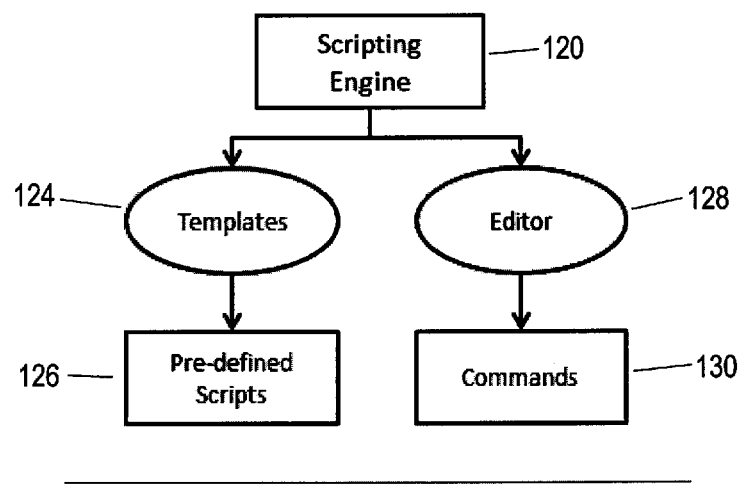
FIG. 7 is a diagram of the scripting engine.

Referring now to FIGS. 6 and 7, the Workflow Engine further constitutes a Scripting Engine 120 and Execution Modules 122. The scripting engine 120 provides the framework for the user to perform a structured or non-structured script execution and consists of two modules, templates 124 which is a collection of pre-defined scripts 126 which will be executed as part of structured testing, and the Editor 128 which provides the user interface for creating/editing custom scripts and consists of editor commands 130 to create/modify scripts. In execution, it executes the scripts/commands sent by the scripting engine.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of testing a mobile device, said method comprising:
   receiving user input to configure an automated workflow for testing a mobile device; and
   executing said automated workflow, wherein said executing said automated workflow comprises:
      generating a test sequence for simulating a stress environment according to a stress model;
      generating a play sequence associated with said test sequence;
      executing said play sequence on said mobile device; and
      analyzing data transmitted from said mobile device that results from said executing said play sequence.

2. The method of claim 1, wherein said stress model is one of a Forward Stress Testing Model, a Reverse Stress Testing Model, and a Field Trial Stress Model.

3. The method of claim 1, wherein said stress environment comprises simulated end user events.

4. The method of claim 1, wherein said executing said automated workflow further comprises: selecting a test type; and editing said test sequence.

5. The method of claim 1, wherein said executing said automated workflow further comprises:
   extracting requirements from a test plan; and
   generating a test case according to said requirements.

6. The method of claim 5, wherein said executing said automated workflow further comprises:
   recording said test case as a profile;
   loading previously recorded profiles; and
   generating said stress environment according to said recorded profiles.

7. The method of claim 1, wherein said executing said automated workflow further comprises repeating said executing said play sequence until a predetermined stress goal is reached.

8. The method of claim 1, wherein said analyzing data comprises: performing data mining and data collection; and monitoring proof of correction.

9. The method of claim 1, wherein said data comprises a key performance indicator (KPI) of a battery, a processor or memory of said mobile device.

10. The method of claim 1 further comprising rendering a graphics user interface (GUI) for display on a display device, wherein said GUI comprises a script editor, and wherein said user input is received through said GUI.

11. The method of claim 1, wherein said user input comprises: selection of said mobile device, an application installed in said mobile device: an emulated radio network condition; and connectivity to an external network.

12. The method of claim 1, wherein said executing said automated workflow further comprises generating a report based on said analyzing said data.

13. The method of claim 1, wherein said executing said automated workflow further comprises selecting a device driver according to a product model of said mobile device.

14. A system comprising:
   a processor;
   memory coupled to said processor and comprising instructions that, when executed by said processor, implement:
      a work flow engine configured to generate a test case according to a test plan for testing a mobile device;
      a playback engine configured to:
         generate a test sequence for simulating a stress environment according to a stress mode; and
         generate a play sequence associated with said test sequence;
         execute said play sequence on said mobile device; and
      an analytics engine configured to analyze data transmitted from said mobile device resulting from executing said play sequence.

15. The system of claim 14, wherein said workflow engine is further configured to extract requirements from a test plan for generating said test case.

16. The system of claim 14, wherein said workflow engine is further configured to: record generated test cases as profiles; and scan said profiles.

17. The system of claim 16, wherein said playback engine is further configured to: load said profiles; and generate said stress environment according to said profiles.

18. The system of claim 14, wherein said analytics engine is further configured to: collect said data; perform data mining; and report said data.

19. The system of claim 14, wherein said playback engine is further configured to access a database to select a tool and a device driver to execute a command or function on said mobile device, and wherein said mobile device is coupled to said system remotely through a communication network.

20. The system of claim 14, wherein said instructions further implement a graphics user interface (GUI) configured to receive user input related to a structured or non-structured script execution.

* * * * *